Sept. 10, 1968     J. P. LINDSEY     3,401,400
APPARATUS FOR COLOR DISPLAY OF SEISMIC DATA
Filed Oct. 20, 1966
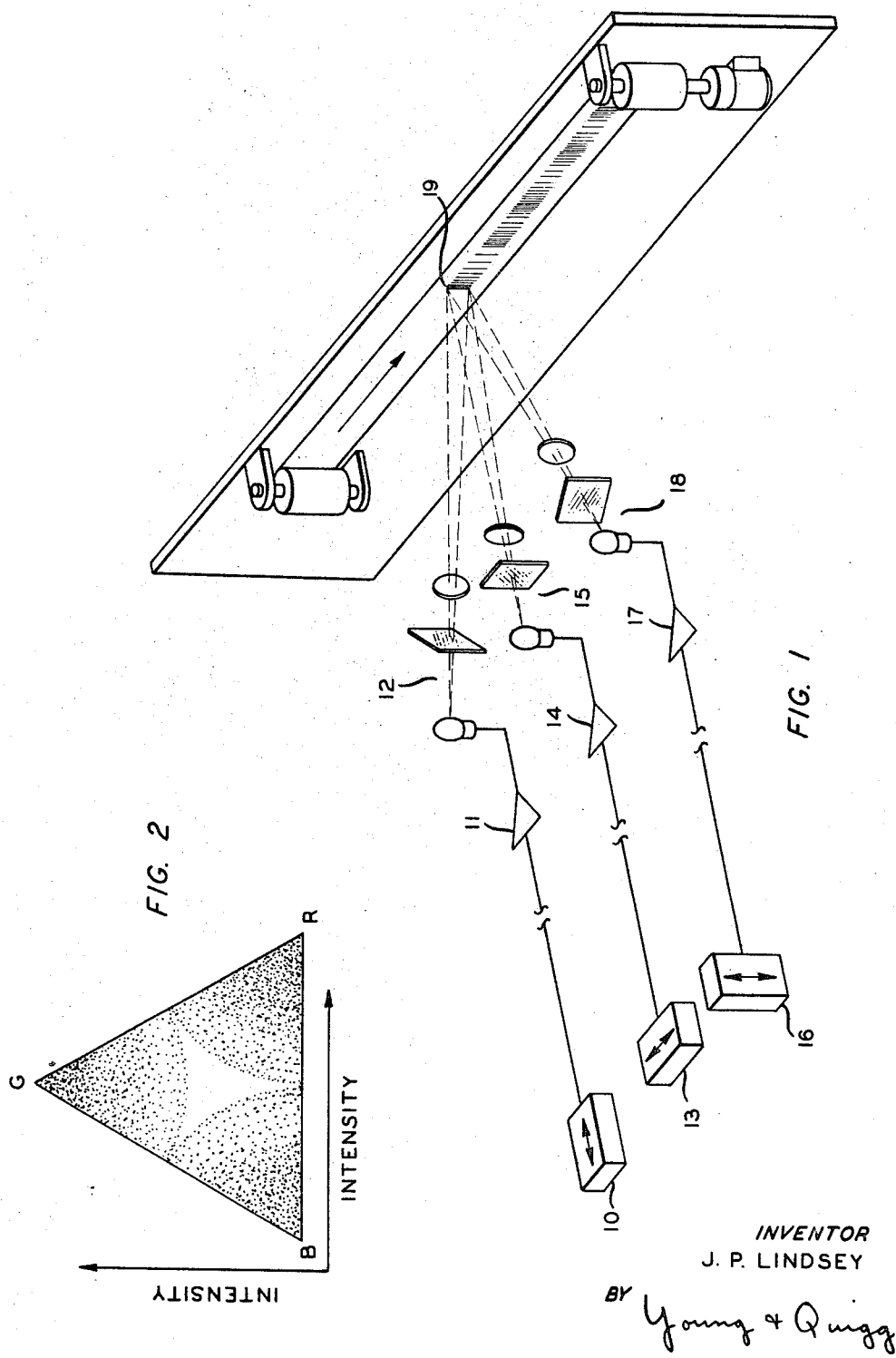
INVENTOR
J. P. LINDSEY
BY Young & Quigg
ATTORNEYS United States Patent Office 3,401,400
Patented Sept. 10, 1968

3,401,400
APPARATUS FOR COLOR DISPLAY OF
SEISMIC DATA
Joe Pat Lindsey, Bartlesville, Okla., assignor to Phillips
Petroleum Company, a corporation of Delaware
Filed Oct. 20, 1966, Ser. No. 588,113
4 Claims. (Cl. 346—108)

ABSTRACT OF THE DISCLOSURE

Apparatus for color display of seismic data in which the independent spatial variables of a seismic signal are summed by varying the intensity of a plurality of colored light sources in response to the magnitude of the variables, the color assigned to each variable being different. All the light sources are focused on a common region of a photographic film.

---

This invention relates to a method and apparatus for optically displaying data by assigning certain portions of the data to colored light sources, permitting the variations in data to vary the intensity of the various light sources, and noting and color of the summed light sources.

Geophysical prospecting using artificially induced seismic disturbances has found wide application in the search for petroleum and other products. It is the general practice to initiate an explosion or other seismic disturbance at a point near the surface of the earth to direct seismic waves downward into the earth from that point. Waves continue to travel downward within the earth, until they encounter discontinuities in the earth's structure in the form of various subsurface formations and the like. These discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated to electrical impulses which are then indicative of the character of the ground motion and are usually referred to as a seismic signal which is in effect a composite signal made up of a plurality of electrical signals varying in frequency and amplitude and requiring three independent spatial directions for proper mathematical representation.

The usual practice has been to examine the amplitude characteristics of the recording made of the seismic signals by correlating the amplitudes of a plurality of traces on the seismic record. Seismic observers can, by observing such traces, determine the shape of reflected subsurface formations. By accurately recording the time required for the seismic wave to travel to the reflection surfaces and to return to the geophone, it is possible to determine the depths to such reflection surfaces.

Prior art reveals methods of displaying seismic signals in optical form. Traditionally, the optical representations are represented by variations of black and white, with no color involved. The method and apparatus of the prior art utilizing a black and white optical representation of seismic data are extremely undesirable in that any single black and white representation can represent only variations in the sum of the three spatial variables of a seismic signal. As a result, variations of any particular spatial variable are indistinguishable.

In summary, but not limited thereto, my invention is superior over the prior art in that it provides a method and apparatus wherein the three spatial variables of a single seismic signal can be represented on a single color varying trace without increasing the size or visual complexity of the display. I accomplish this remarkable advantage by using a three-color light system, each color of which is intensity modulated. The signals used for modulation represent the output signals from a seismometer wherein each of the three spatial directions required to adequately and precisely define the three-dimensional representation of the seismic signal is assigned to a different light source. The three colors I have used in one specific embodiment of my invention comprise green, red, and blue. When these light sources are focused on a line or point and are of equal intensity, the optical representation of the sum of the light sources is that of white. Variations in color of the summation of the three light sources reflect intensity modulations of any of the three individual light sources as a result of metering the spatial components of a seismic signal previously assigned to that particular light source. Consequently, the three spatial variables of a seismic signal are represented by color changes of the summed colors. The color variation resulting from metering the three spatial components of a seismic signal is, according to one embodiment of my invention, but not limited thereto, recorded on a moving color-sensitive photographic film so as to produce a variable color trace.

Accordingly, an object of my invention is to provide a method and apparatus wherein one single colored signal can represent a multiplicity of data variables.

Another object of my invention is to provide a method and apparatus wherein the three spatial components of a seismic signal can be represented by a single color or variations of colors.

Other objects, advantages, and features of my invention will be readily apparent to those skilled in the art from the following description, drawing, and appended claims.

With reference to FIGURE 1, there is indicated a schematic view of one embodiment of the inventive method and apparatus, together with a representation of the summed intensities for one particular embodiment of the invention, shown in FIGURE 2.

With particular reference to FIGURE 1, there is indicated seismic signal sensing means 10 capable of sensing only horizontal motion in one direction. Said seismic signal sensing means 10 generates an electrical signal, as a consequence of sensing said seismic signal, whereupon said seismic signal sensing means 10 communicate said signal to amplification means 11, wherein said electrical signal is amplified. Said amplified electrical signal flowing from amplification means 11 is communicated to and actuates variable color intensity light source means 12. Variable color intensity light source means 12 comprises a light source, a colored filter of the appropriate color, and a focusing means. With more particular reference to FIGURE 1, there is further indicated seismic signal sensing means 13, amplification means 14, variable color intensity light source means 15, seismic signal sensing means 16, amplification means 17, variable color intensity light source means 18, all of which function in a similarly described manner as aforementioned. Amplification means 11, 14, and 17 can comprise any DC or AC amplifier suitable for the particular service.

It is to be understood that seismic signal sensing means 10, 13, and 16 represent means to sense the three independent spatial variables corresponding with the three spatial axes necessary to mathematically describe the single seismic signal. Seismic signal sensing means 10 senses horizontal motion in a first direction; seismic signal sensing means 13 senses horizontal motion in a direction perpendicular to but in the same plane as seismic signal sensing means 10; and seismic signal sensing means 16 senses vertical motion.

It is, of course, to be understood that the particular sensing means will vary with the character of the signal to be sensed; as will the actual number of sensing means to be employed.

It is to be understood, also, that any means whatsoever to sense the three spatial variables of a single seismic signal can be used in the practice of this invention. Specifically, either a single geophone capable of sensing direction in three dimensions, such as is disclosed in U.S. 2,390,328, or three separate geophones, such as is disclosed in U.S. 2,487,029, capable of sensing motion in only one direction can be employed.

It is further to be understood that any colors can be employed, as well as any number of colored light sources. It will, furthermore, be understood by those learned in the art that not only a single signal, having a multiplicity of variables, can be represented by the method of my invention, but also a plurality of signals, each having a single or multiplicity of variables, can be represented by the practice of my invention by simply varying the number of sensing means and the number of variable light source means. I have found, however, that while any number of light source means are within the scope of this invention, particularly good results can be obtained by using three variable light source means. I have also found that while the variable light source means can comprise any color, it is particularly advantageous for the three-light source means to combine to form a white hue. Particularly, the colors of green, red, and blue are satisfactory in that they encompass most of the visible range of hues. This white hue indicates, for the aforementioned particular selection of colors, an absence of signal sensing by the selected sensing means. As a consequence of the summation of the variable intensity of light source means, any alteration in the intensity of any of the variable intensity light source means would change the summed color to reflect variations in data being sensed and subsequently displayed by the particular light source means to which the data has been assigned for display. Correspondingly, any or all of the variable intensity light source means can vary individually so as to reflect data sensing; and as a result, the summation of the variable intensity colors will indicate to those skilled in the art the quantity and quality of the data being sensed.

It is fully within the countenance of my invention to either observe or record the summed color signal. Observation of the summed signal can be by use of the human eye or through the use of color detecting instruments. Recording of the summation of the light sources can be by any means convenient to the user, such as color-sensitive photographic film, as indicated by reference 19 in FIGURE 1.

It is, additionally, within the scope of my invention to provide for the other than instantaneous display of the data by recording said summation over any desirable finite period of time. I find that it is particularly desirable to focus the light source means on a translating color-sensitive film. As the data is sensed and the summation of the colors varies, a variable color trace is produced on the color-sensitive film. This method provides not only a permanent but also a time correlated recording of the sensed data. This method is indicated by reference 19 in FIGURE 1.

While my invention finds particular application to seismic exploration, it can be used to sense and display any signal. My invention is particularly applicable where it is deemed desirable to display data that represents a summation of a plurality of data variables. As an example, pressure and temperature could be sensed and the enthalpy displayed. As a further example, the pressure and temperature of an ideal gas could be sensed and the volume represented by color variations.

This invention is thus broadly applicable to sensing a signal or signals and displaying the summation of the various signal variables.

Various modifications of my invention can be made in view of the foregoing disclosure and appended claims without departing from the spirit or scope thereof.

As an example of the operation of the specific embodiment of my invention described earlier, assume that the particle motion difference expected between a plane wavefront arriving from a subsurface reflector and a Rayleigh wave traveling along the surface is that the Rayleigh wave produces a circular particle motion and the reflection produces a vertical motion. The circular motion of the Rayleigh wave causes equal amplitude and quadrature-phased electrical signals to be produced at the outputs of the vertical and one horizontal geophone of the three-dimensional seismometer. The purely vertical motion of the reflection wavefront produces an output from the vertical geophone only. The differences in color display produced is best illustrated by reference to a color diagram, shown in FIGURE 2. In this diagram, color hues are plotted on a two-dimensional grid of intensity vs. intensity. Three primary colors are shown at the corners of a triangle. The area inside this triangle encompasses the majority of color hues that are visible to the human eye.

With further reference to FIGURE 2, mixtures of hues, shown as points on this diagram, appear (to an approximation) as a single hue, the point of which lies at the spatial means of the points representing the hues mixed. Suppose the vertical geophone output is allowed to modify the intensity of a green light, the horizontal in-line geophone output is allowed to modify the intensity of a red light, and the horizontal lateral geophone output is allowed to modify the intensity of a blue light. Each of these colored lights is brought to focus on the same track of a color-sensitive film being transported past the light in either a seismic camera, or on a seismic drum. If pure vertical motion of the seismometer occurs, only the green light will be modulated and the net hue of the variable color track will range from an established level of near-white or gray (the result of uniform mixture of the three primary colors and indicative of no signal being sensed) to absolute green or a total absence of green, with shades of green in between. If a circular motion of the seismometer occurs in the vertical plane of profile, only the green and red lights will be modulated; and since they are out of phase by 90°, the hue will vary from green to red with orange occurring in between.

In a similar fashion, other more complex particle motions will be characterized by distinctive color bands on the color display. With this type of display, wave motion phenomena which can be distinguished by particle motion will show as a differing set of color bands. Structural features will appear as on a variable density black-white display, but in bands of color rather than bands of black and white.

This color scheme allows distinction of particle motion on the ground without increasing the size of or visual complexity of the record, as well as providing for the three-dimensional mathematically representation of a seismic signal in one single variable color trace.

I claim:

1. Apparatus for mathematically representing the spatial components of a signal comprising:
    sensing means including first means for sensing a first independent spatial variable of said signal, second means for sensing a second independent spatial variable of said signal, and third means for sensing a third independent spatial variable of said signal;
    colored light sources actuated by each signal variable;
    means for recording the summation of said light sources;
    means for focusing each colored light source on an identical region of said recording means.

2. The apparatus of claim 1 wherein said sensing means is a seismic sensing means comprising either one dimensional geophone placed along three independent spatial axes, or a single geophone capable of sensing movement in three spatial directions.

3. The apparatus of claim 1 wherein the recording means comprises color-sensitive photographic film capable of being translated in such a manner as to produce a variable color trace.

4. The apparatus of claim 1 including means to amplify variables of said signal comprising an A.C. amplifier.

References Cited

UNITED STATES PATENTS

| | | | |
|---|---|---|---|
| 2,944,620 | 7/1960 | Van Dick | 181—0.5 |
| 2,951,736 | 9/1960 | Black | 346—1 |
| 2,991,446 | 7/1961 | Loper | 340—15 |
| 3,050,731 | 8/1962 | Usdin | 346—1 |
| 3,243,821 | 3/1966 | Bogs et al. | 346—109 |

RICHARD B. WILKINSON, *Primary Examiner.*

J. W. HARTARY, *Assistant Examiner.*